(12) United States Patent
DeYoung et al.

(10) Patent No.: US 8,917,754 B2
(45) Date of Patent: Dec. 23, 2014

(54) ALUMINUM MELTING APPARATUS

(71) Applicant: Alcoa Inc., Pittsburgh, PA (US)

(72) Inventors: David DeYoung, Export, PA (US);
Edward Williams, Apollo, PA (US);
Donald Stewart, Latrobe, PA (US)

(73) Assignee: Alcoa Inc., Pittsburgh, PA (US)

( * ) Notice: Subject to any disclaimer, the term of this patent is extended or adjusted under 35 U.S.C. 154(b) by 98 days.

(21) Appl. No.: 13/786,967

(22) Filed: Mar. 6, 2013

(65) Prior Publication Data

US 2014/0096644 A1    Apr. 10, 2014

Related U.S. Application Data

(60) Provisional application No. 61/712,101, filed on Oct. 10, 2012.

(51) Int. Cl.
*C22B 21/00* (2006.01)
*H05B 1/00* (2006.01)
*F27B 14/00* (2006.01)
*H05B 3/60* (2006.01)

(52) U.S. Cl.
CPC .............. *C22B 21/0084* (2013.01); *H05B 1/00* (2013.01); *C22B 21/0092* (2013.01); *F27B 14/00* (2013.01); *H05B 3/60* (2013.01)
USPC ............... 373/72; 373/75; 373/90; 205/705; 205/710; 266/242

(58) Field of Classification Search
CPC .. C22B 21/0092; C22B 21/0084; F27B 14/06
USPC ................. 373/90, 72, 75; 205/705, 710
See application file for complete search history.

(56) References Cited

U.S. PATENT DOCUMENTS

| | | | |
|---|---|---|---|
| 2,787,592 A * | 4/1957 | Burkhardt | .................... 205/705 |
| 3,085,124 A | 4/1963 | Upton | |
| 3,128,327 A | 4/1964 | Upton | |
| 4,761,207 A | 8/1988 | Stewart, Jr. et al. | |
| 5,057,194 A | 10/1991 | Stewart et al. | |

* cited by examiner

*Primary Examiner* — George Wyszomierski
*Assistant Examiner* — Tima M McGuthry Banks
(74) *Attorney, Agent, or Firm* — Greenberg Traurig, LLP (57) ABSTRACT

A method and apparatus for melting aluminum uses a dense metal salt of Rubidium, Cesium, or Strontium. The salt is melted by a stinger and then superheated by AC applied to electrodes immersed in the salt. Aluminum in contact with the salt melts and floats on the salt. In continuous scrap melting, inflows and outflows of aluminum are comparable and may be shielded by inert gas. The superheated salt may be purified and may be heated in a separate reservoir and pumped to and from another reservoir containing salt and/or metal. The salt may be used to supplement the heating of an existing furnace.

16 Claims, 9 Drawing Sheets

ALUMINUM MELTING APPARATUS

FIELD OF THE INVENTION

The present disclosure relates to an apparatus for melting aluminum, and, more particularly, to an apparatus and method for melting of aluminum using electricity.

BACKGROUND OF THE INVENTION

The melting of aluminum with gas or oil-fired reverberatory furnaces typically has an energy efficiency of 25% to 40% and produces significant emissions of $CO_2$, and $NO_x$ compounds. Melting aluminum with electrical induction furnaces reduces emissions, but the energy efficiency is reduced by the need to cool the induction coil. Induction melting also requires significant electric supply power infrastructure. Electrical resistance furnaces may also be used to melt aluminum using radiation from electrical resistance elements, but the rate of melting is low. Another attribute of hydrocarbon-fired reverberatory furnaces and electric resistance furnaces is significant melt loss, e.g., ranging from 1 to 5%, attributable to oxidation.

SUMMARY OF THE INVENTION

The present disclosure provides an apparatus that utilizes AC electrical energy to heat a salt layer that is denser than aluminum. The electricity charges electrodes contacting the salt deposited in a furnace, generating currents through the salt and heating the salt via Joule heating attributable to the resistivity of the salt. The molten salt transfers heat energy to aluminum introduced above it, melting the solid aluminum charge. Due to gravity and the density differential, the aluminum floats on the molten salt layer. The salt contains at least one of the heavier group 1 and 2 metal salts, rubidium, cesium or strontium, and may optionally contain mixtures of such salts and/or mixtures with barium salts.

An embodiment of the present disclosure relates to an apparatus for melting aluminum, having a receptacle with a first portion capable of containing a salt, and a second portion capable of containing aluminum. The first portion is disposed below and in fluid communication with the second portion. A salt of at least one of the metals selected from the group Rubidium, Cesium, and Strontium is disposed in the first portion, the salt having a density greater than molten aluminum. A pair of spaced electrodes is disposed in the first portion connected to a source of electrical power capable of establishing an electrical potential between the spaced electrodes. The salt supporting an electric current between the electrodes that heats the salt through Joule heating to a temperature above the melting point of aluminum.

In another embodiment, a cover is disposed over the second portion.

In another embodiment, a non-reactive gas is present in the receptacle between the aluminum in the second receptacle and the cover.

In another embodiment, the gas is Argon.

In another embodiment, the receptacle is divided into a first receptacle for the first portion and a second receptacle for the second portion, the first and second receptacles in fluid communication.

In another embodiment, a pump moves the salt between the first receptacle and the second receptacle.

In another embodiment, the second receptacle underlies a sidewell furnace.

In another embodiment, the second receptacle underlies a charging well of the sidewell furnace.

In another embodiment, the second receptacle underlies a gas-fired heat bay.

In another embodiment, a reservoir is in communication with the second portion to receive and store molten aluminum.

In another embodiment, a plurality of reservoirs are in communication with the second portion to receive and store molten aluminum.

In another embodiment, the first portion and the second portion are contiguous with one another.

In another embodiment, the second portion has a greater volumetric capacity than the first portion.

In another embodiment, the electrical power is AC.

In another embodiment, the salt further comprises a Barium salt mixed therewith.

In another embodiment, an apparatus is used for melting the salt to liquid form.

In another embodiment, the electrodes extend through the aluminum in the second portion down to the salt in the first portion, each of the electrodes having an insulator coating on a portion thereof that extends through the aluminum, the insulator coating being absent from at least a part of each of the electrodes that extends into the salt.

In another embodiment, a method for melting aluminum includes the steps of depositing a layer of a salt of at least one of the metals selected from the group Rubidium, Cesium, and Strontium into a receptacle, the salt having a density greater than molten aluminum and a higher melting point; melting the salt to a liquid; subjecting the salt to an AC current of electricity between spaced electrodes, resulting in the heating of the salt to keep the salt in the molten state;

depositing aluminum into the receptacle on top of the salt; and melting the aluminum.

In accordance with another embodiment, the step of depositing aluminum into the receptacle is conducted continuously at a selected rate and further including the steps of thermostatically controlling the AC current to maintain the salt at a temperature required to melt the aluminum continuously supplied; and removing molten aluminum from the receptacle at a rate that is comparable to the rate of depositing.

In accordance with another embodiment, the aluminum deposited is scrap and further including the steps of covering the receptacle to limit exposure of the molten aluminum in the receptacle to air to prevent oxide formation and the steps of periodically cleaning oxides from the salt by dissolving the salt in water, filtering the oxides out of the resultant solution and then dehydrating the salt solution.

In accordance with another embodiment, the steps are conducted for a sidewell system.

In accordance with another embodiment, a method for supplementing heat provided to a system handling molten aluminum contained within a reservoir, includes the steps of depositing a layer of a salt of at least one of the metals selected from the group Rubidium, Cesium, and Strontium into a receptacle, the salt having a density greater than molten aluminum and a higher melting point; melting the salt to a liquid; subjecting the salt to an AC current of electricity between spaced electrodes resulting in the heating of the salt to keep the salt in the molten state; and bringing the molten salt into proximity with the aluminum in the reservoir to allow the heat energy contained in the molten salt to be transmitted to the aluminum in the reservoir.

In accordance with another embodiment, the aluminum in the reservoir is at least partially heated by a gas fire.

BRIEF DESCRIPTION OF THE DRAWINGS

For a more complete understanding of the present disclosure, reference is made to the following detailed description of an exemplary embodiment considered in conjunction with the accompanying drawings.

DETAILED DESCRIPTION OF THE EXEMPLARY EMBODIMENT

Figure 1:
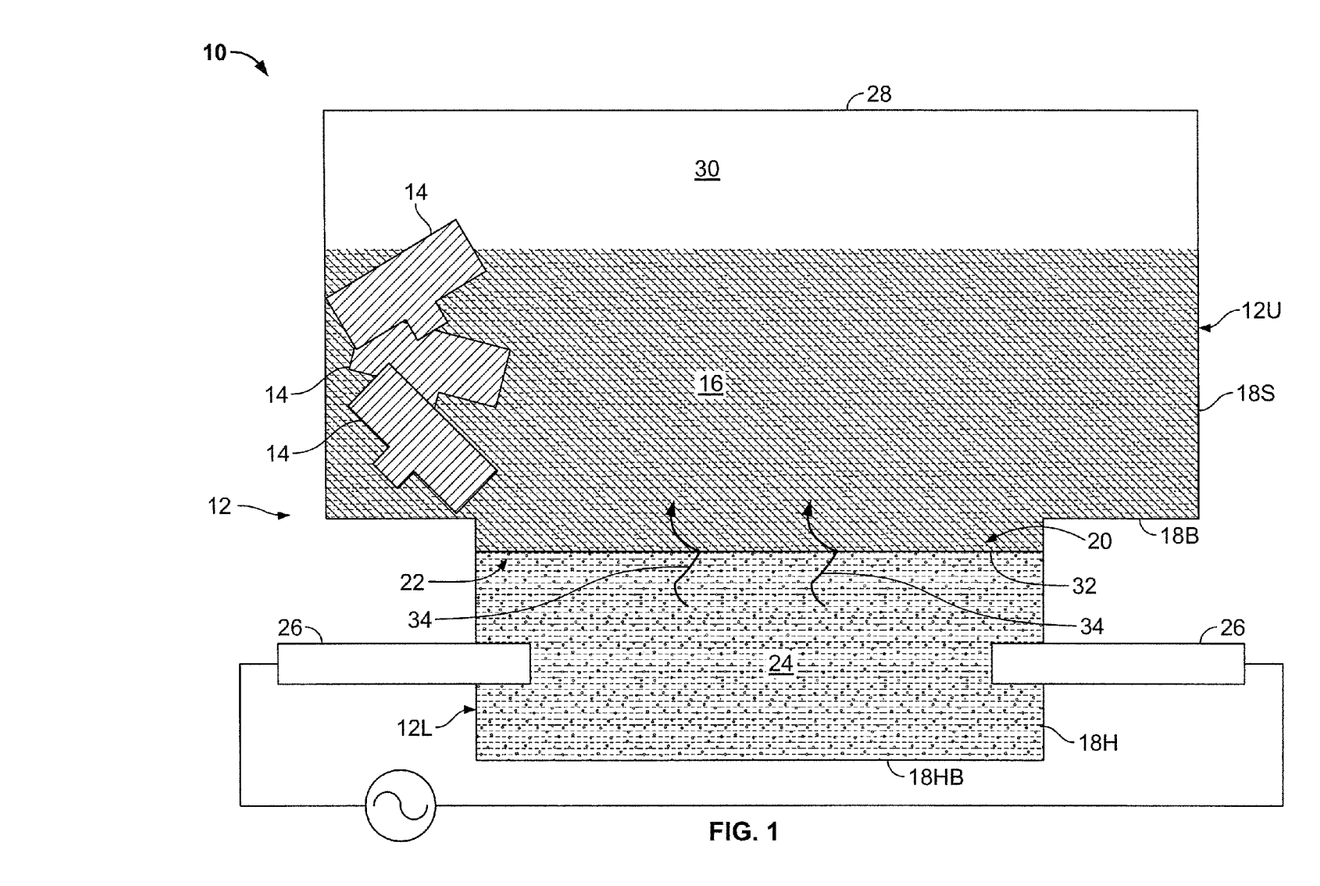
FIG. 1 is a schematic elevational view of a melting apparatus in accordance with one embodiment of the present disclosure.

FIG. 1 illustrates a furnace 10, which may be used for melting solid aluminum, e.g., aluminum scrap, such as recycled aluminum cans or scraps from manufacturing processes, in accordance with one embodiment of the present disclosure. The melted aluminum can then be tapped, drained, suctioned or poured into ingots and further processed into finished products. The furnace 10 has a holding chamber 12 that receives and contains aluminum in solid 14 and liquid 16 (molten) form. The walls 18S, 18B, 18H, 18HB of the holding chamber 12 may be made in accordance with typical aluminum reverb construction methods, e.g., utilizing steel outer walls lined with refractory materials.

In the embodiment shown in FIG. 1, the holding chamber 12 has an upper portion 12U and a smaller, lower portion 12L. The interior volumetric areas of the upper portion 12U and the lower portion 12L are in communication and may be formed from a contiguous wall structure, e.g., wall 18B may be integrated with wall 18H. The relative proportions of the upper portion 12U and lower portion 12L of the holding chamber may be varied, including a configuration wherein the side walls 18S extend straight down to the bottom wall 18HB.

As a further alternative, the upper portion 12U and lower portion 12L may be separately formed and mechanically joined together, the upper portion 12U having a bottom opening 20 that communicates with a top opening 22 in the lower portion 12L. The lower portion 12L may be used as a receptacle for salt 24 that may be heated by electricity and which is then used to heat the aluminum 14, 16, as further described below. The salt 24 may be super-heated by electrical power provided to a pair of AC electrodes 26 mounted in opposing sides of the lower portion 12L and extending into the salt 24. In an alternative embodiment, the electrodes do not extend significantly into the salt 24 and may be flush with the interior surface of wall 18H, shielding the electrodes from mechanical damage associated with the filling of the lower portion 12L with salt. The salt 24 is melted from the solid state by an electrical resistance element, commonly known as a "stinger" (not shown) and once in the molten state, supports an electric current between the electrodes 26, which causes the molten salt to become super-heated to a temperature suitable for melting aluminum 14. In accordance with an embodiment of the present disclosure, the salt 24 has a density in the molten state that is greater than that of aluminum in either the molten or solid state. In this manner, the molten salt 24 will occupy a position in the holding chamber 12 below that of the aluminum 14, 16. To achieve the preferred density, the salt 24 contains salts of at least one of the heavier group 1 and 2 metal salts, such as rubidium, cesium, strontium or barium (with Chlorine or Fluoride), such as CsCl, or mixtures such as CsCl/CsF or CsCl/BaCl2. Optionally small amounts of MgCl2 may be added to the mixture to preserve the alloy composition of aluminum alloy scrap that is recycled in the furnace 10.

These dense salts may be provided in pure form or in mixtures to form the salt 24, which, due to gravity, forms a lower layer in the holding chamber 12 relative to the aluminum 14, 16. The furnace 10 may be provided with a removable top cover 28, allowing the containment of an inert gas 30, such as Argon, which is introduced into the furnace 10 to avoid oxidation of the aluminum 14, 16 charged in the furnace 10, as well as to diminish hydrogen pick-up. After charging, the top cover 28 would be placed over the furnace 10 and the inert gas 30 continuously injected into the top cover 28 to displace air from contacting the molten aluminum 16.

The furnace 10 may be used to melt aluminum 14, by introducing a quantity of dense salt 24 into the lower portion 12L of the holding chamber 12. The salt 24 is melted by a stinger and then maintained in a melted/super-heated state by an AC voltage applied across the electrodes 26, generating an electrical current through the salt 24 between the electrodes 26. The electric current superheats the salt 24 via Joule heating. The holding chamber 12 of the furnace 10 is then charged with a load of solid aluminum 14. The temperature of the salt 24 may be maintained and adjusted by controlling the electrical energy applied to the electrodes. Thermal energy (heat flux) is conducted by the hot salt 24 into the upper portion 12U of the holding chamber 12 and also transferred by conduction, as indicated by arrows 34 and melts the solid aluminum 14, producing molten aluminum 16. Since the molten aluminum 16 is less dense than the salt 24, the molten aluminum 16 floats on the salt 24, defining an interface 32 between the two liquids 16, 24. The separation of the aluminum 16 and the salt 24 into stratified phases due to different densities minimizes the chemical interaction/reaction of the aluminum 16 and associated aluminum oxides with the salt 24 layer. Thermal energy is efficiently transferred at the interface 32 due to the substantial, intimate contact area between the aluminum 16 and the salt 24 and rising heat buoyancy. In the event solid aluminum 14 is placed in contact with molten salt 24, the thermal energy transfer from the salt 24 to the aluminum 14 is efficient because the molten salt can conform to the surface of the solid aluminum 14. Similarly, there is efficient heat transfer between solid aluminum 14 and molten aluminum 16. The cover 28 assists in retaining the heat generated by the Joule heating within the holding chamber 12, as do the walls 18S, 18B, 18H and 18HB. After the aluminum 14 is melted, a portion of the molten aluminum 16 may be drained, suctioned or poured to a holding furnace or to an ingot mold for casting. More solid aluminum 14 may then be charged into the molten aluminum 16 and salt 24. The above-described method and apparatus are suitable for conducting a batch process, but modifications may be made, as described below, to perform a continuous melting process.

Figure 2A:
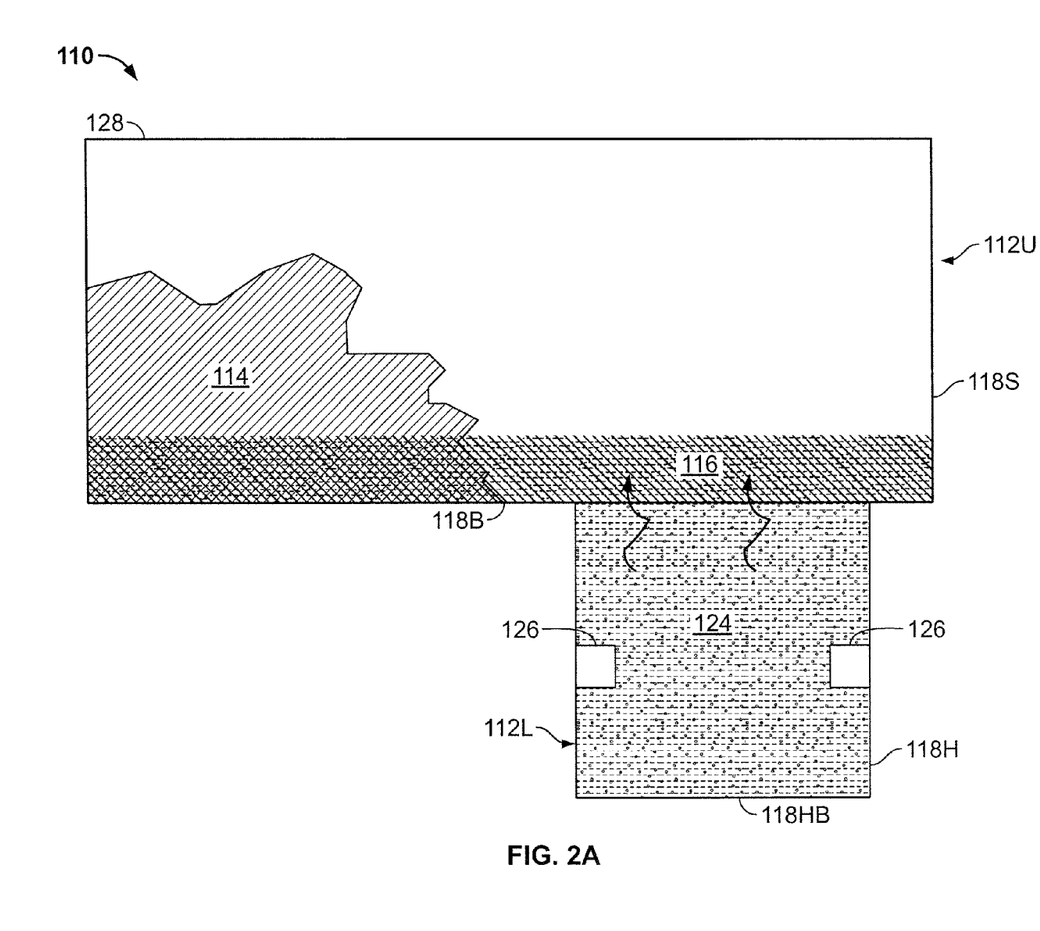
FIG. 2A is a schematic elevational view of a melting apparatus in accordance with another embodiment of the present disclosure.
Figure 2B:
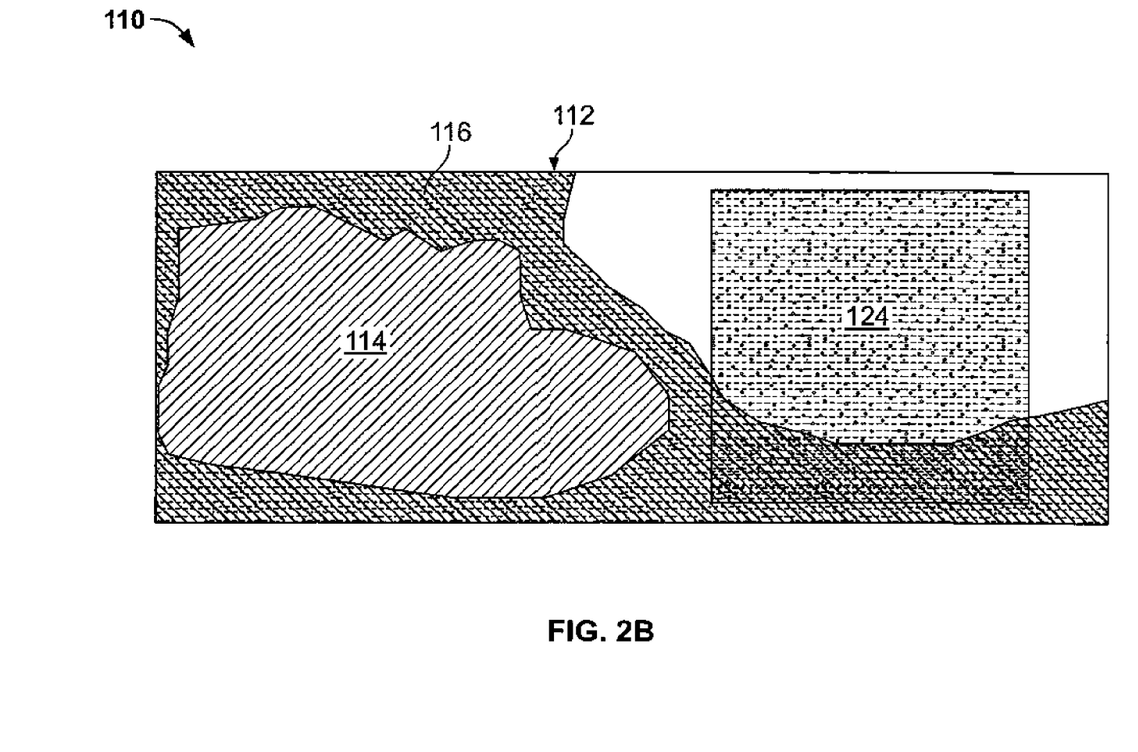
FIG. 2B is a schematic plan view of the melting apparatus shown in FIG. 2A.

FIGS. 2A and 2B depict another embodiment of the present disclosure. Elements illustrated in FIGS. 2A and 2B, which correspond, either identically or substantially, to the elements described above with respect to the embodiment of FIG. 1 have been designated by corresponding reference numerals increased by one hundred. Unless otherwise stated, the embodiment of FIGS. 2A and 2B is constructed and assembled in the same basic manner as the embodiment of FIG. 1.

FIGS. 2A and 2B illustrate a furnace 110 in accordance with another embodiment of the present disclosure. The furnace 110 includes a holding chamber 112 with an upper portion 112U and a lower portion 112L as formed by walls 118S, 118B, 118H and 118HB. Salt 124 may be contained in the lower portion 112L and superheated by electrodes 126. As in FIG. 1, the hot dense salt 124 melts the solid aluminum 114 to yield molten aluminum 116, which floats on the dense salt 124. In FIGS. 2A and 2B, the size, shape and positioning of the lower portion 112L relative to the upper portion 112U is different than in FIG. 1, showing one of many variations that are possible within the scope of the present disclosure. In FIG. 2B a segment of the molten layer of aluminum 116 has been removed to enable visualization of the underlying salt 124. FIG. 2B shows that the salt 124 underlies only a portion of the molten aluminum 116 contained within the holding chamber 112.

Figure 3A:
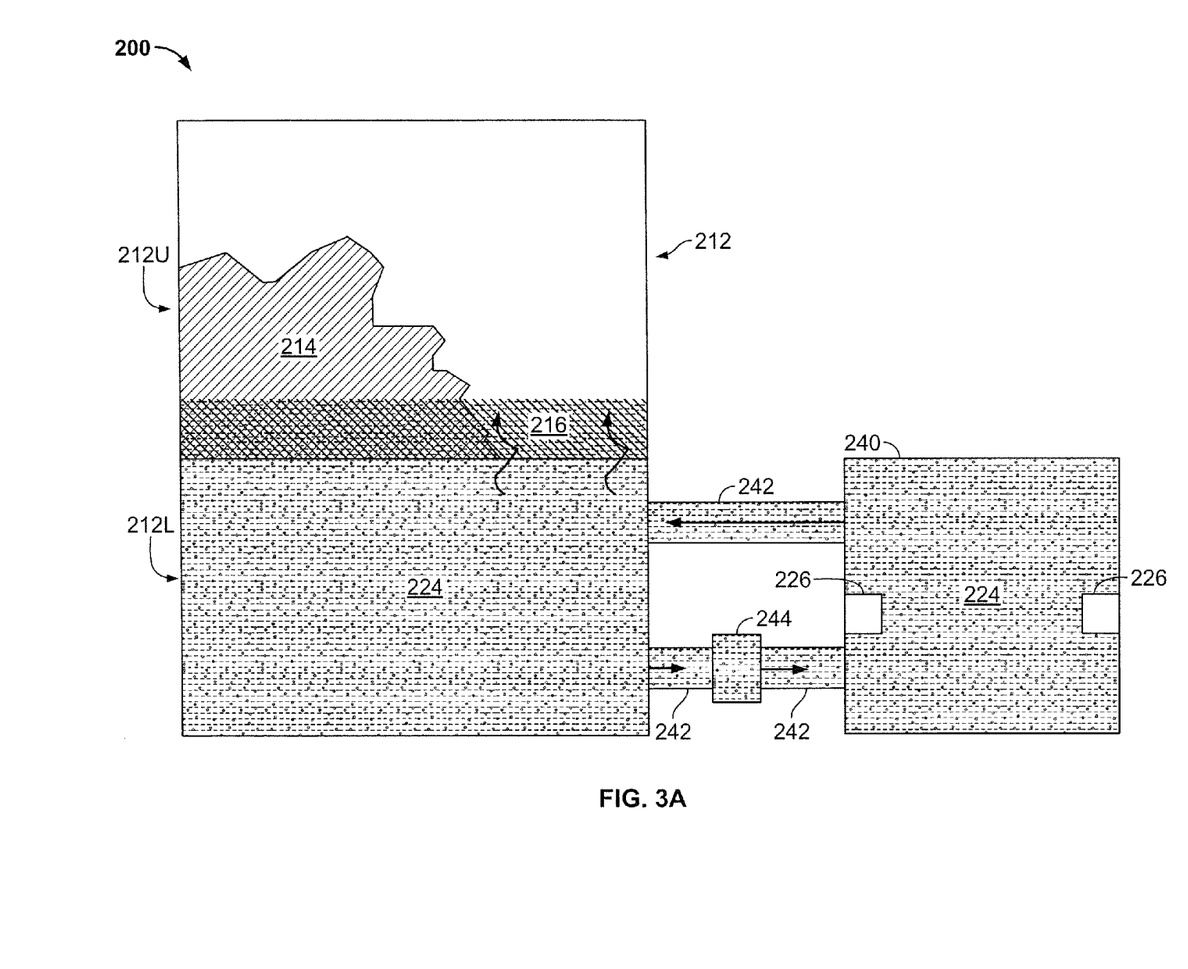
FIG. 3A is a schematic elevational view of a melting apparatus in accordance with another embodiment of the present disclosure.
Figure 3B:
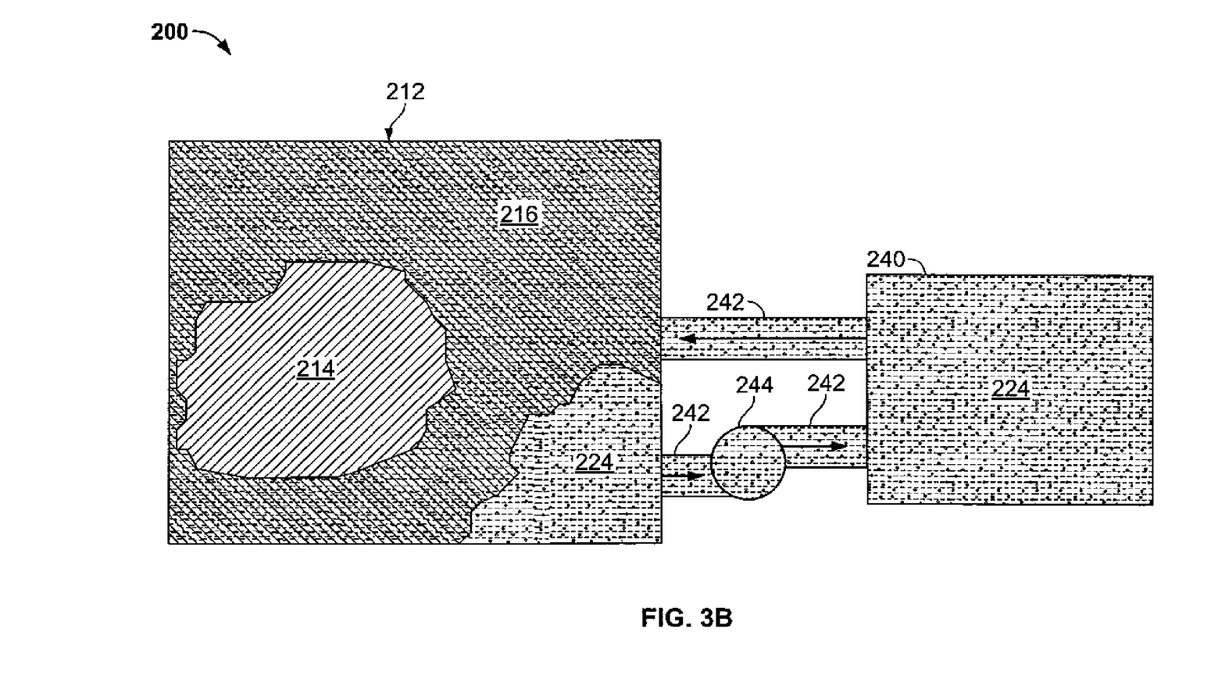
FIG. 3B is a schematic plan view of the melting apparatus shown in FIG. 3A.

FIGS. 3A and 3B illustrate an aluminum melting system 200 in accordance with another embodiment of the present disclosure. The system 200 has a holding chamber 212 with upper and lower portions 212U and 212L, respectively, which may or may not be structurally distinct, given that the holding chamber 212 may be monolithic in structure. Notwithstanding, the lower portion 212L is functionally distinguishable from the upper portion 212U in that the lower portion 212L may contain molten salt 224, whereas the upper portion would contain aluminum in solid 214 and liquid 216 form. The salt 224 is super-heated by electrodes 226 that extend into a separate salt heat bay 240, which may be constructed in a similar manner to holding chambers 12, 112, e.g., having a steel outer covering and a refractory lining. Molten salt 224 in the salt heat bay 240 may be conducted in liquid form to the lower portion 212L of the holding chamber 212 via pipes 242, under the influence of a pump 244. Once in the lower portion 212L, the hot salt 224 may be used to melt the solid aluminum 214 in the upper portion of the holding chamber 212U, with the aluminum 214, 216 floating on the liquid salt due to different densities. The flow of salt 224 between the heat bay 240 and the lower portion 212L allows the salt 224 to be maintained at the proper temperature. The separate salt bay 240 may also be used to facilitate cleaning the salt, if required, e.g., the removal of oxides and sludges by filtration and dissolution of the salt in water, the oxides not being soluable in water, followed by evaporation of the water from the salt and subsequent drying.

Figure 4:
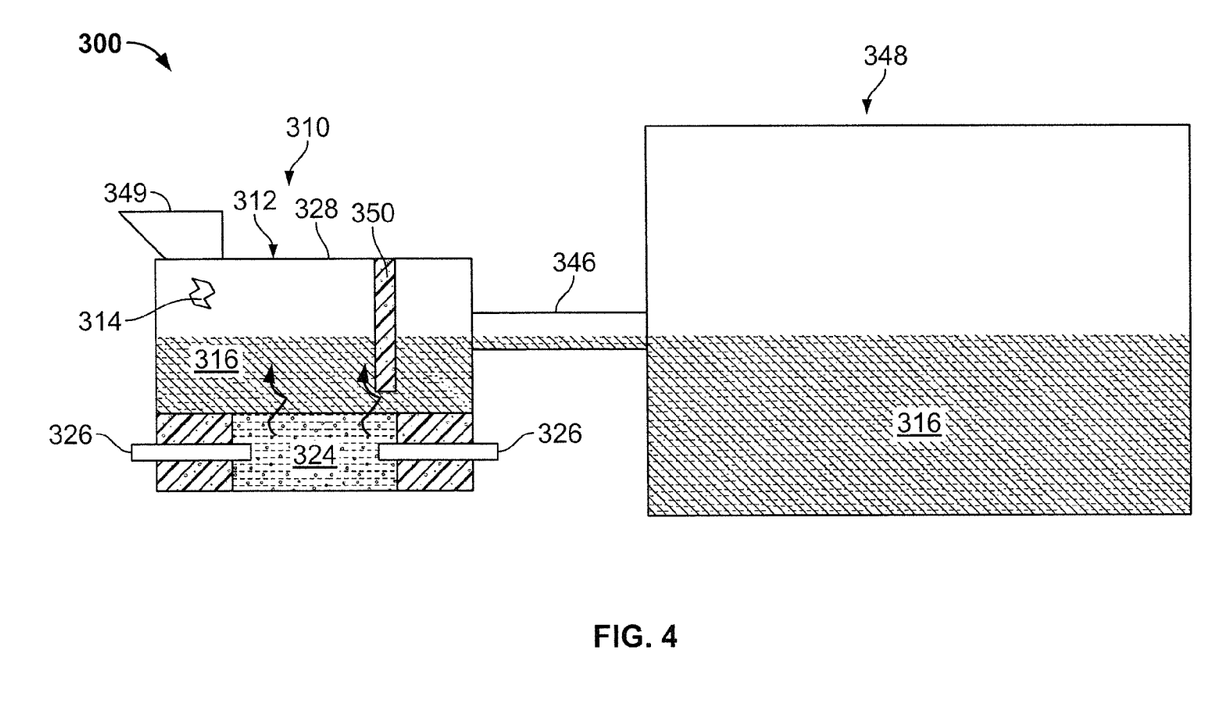
FIG. 4 is a schematic elevational view of a melting apparatus in accordance with another embodiment of the present disclosure.

FIG. 4 illustrates a system 300 in accordance with another embodiment of the present disclosure. The system 300 includes a furnace 310 similar to the furnace 10 described above in reference to FIG. 1 connected by an outlet conduit 346 to a reservoir 348 for molten aluminum 316, which may be a holding furnace or other vessel suitable for holding a quantity of molten aluminum 316. The furnace 310 has a hopper 349 through the top 328 of the holding chamber 312 through which a continuous stream of solid aluminum 314 may be charged into the furnace 310. The hopper 349 may be provided with a door that limits the loss of heat from the holding chamber 312. As before, a dense salt 324 is melted and super-heated in the holding chamber 312 by an electrical current passing through the salt 324 between two electrodes 326. The liquid salt 324 heats and melts aluminum 314, 316, which floats on the liquid salt 324. As the level of molten aluminum 316 rises, due to the addition of solid aluminum 314 through the hopper 349, the molten aluminum 316 reaches the level of and courses through the conduit 346, entering the aluminum reservoir 348. A baffle 350 may be provided to prevent solid aluminum 314 from entering the conduit 346. A plurality of furnaces 310 may be utilized to facilitate substitution of one for another and/or to simultaneously feed a common reservoir 348 with molten aluminum.

Figure 5:
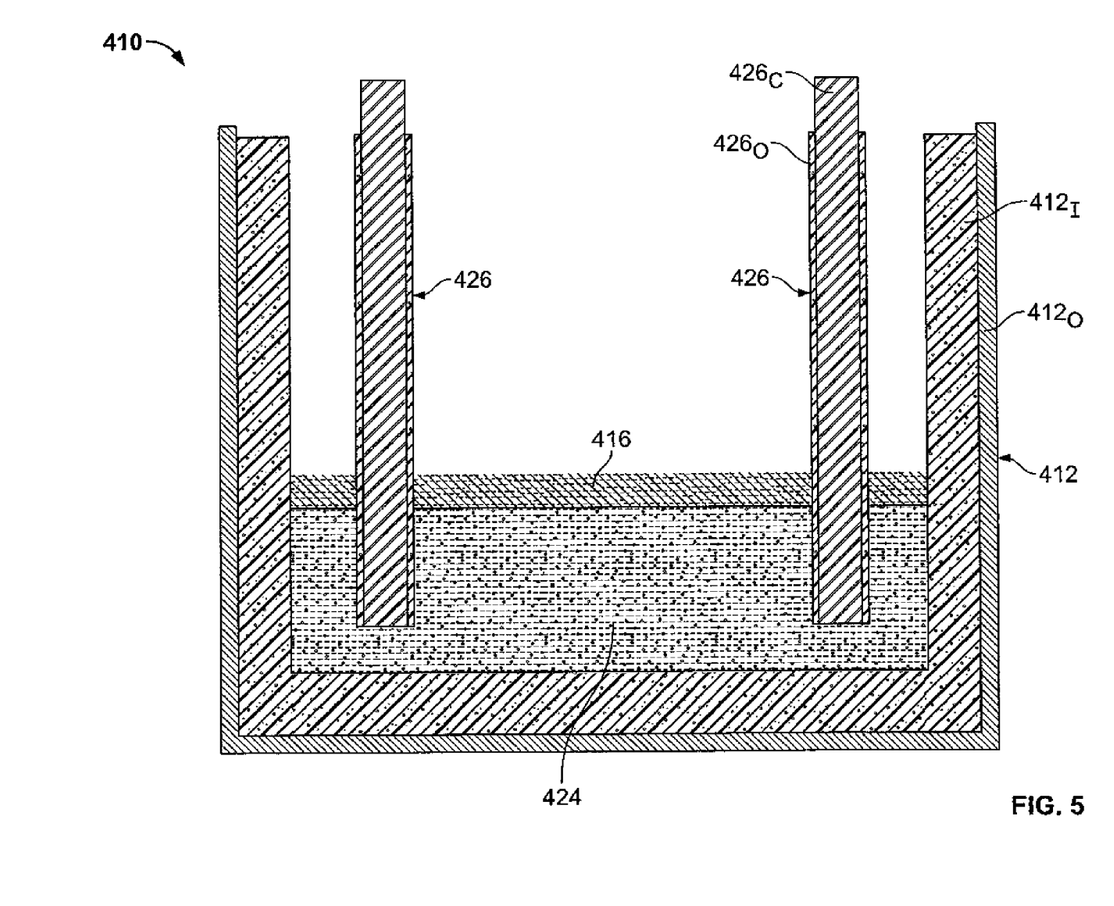
FIG. 5 is a schematic elevational view of a melting apparatus in accordance with another embodiment of the present disclosure.

FIG. 5 shows a system 410 in accordance with a fifth embodiment of the present disclosure and having a furnace 412. The furnace 412 has an outer wall $412_O$ and an inner lining of insulator material $412_I$. The electrodes 426 have a core $426_C$, e.g., made from graphite and an outer layer $426_O$ made from an electrical insulator, such as alumina. As in previously described embodiments, the electrodes 426 are connectable to a source of electricity, such that when the electricity is applied to the electrodes 426, the current passing between (at the submerged, un-insulated ends) through a molten, dense salt 424 (described above), raises the salt to a super-heated temperature suitable for melting aluminum 416. The outer layer $426_O$ prevents the electrodes from shorting out through the aluminum layer 416 and permits the electrodes 426 to be inserted into the furnace 412 from above. In use, the electrodes are placed into the salt layer 424 prior to being electrified or are inserted into the salt bath 424 prior to the introduction of aluminum 416. Because the electrodes 426 are not integrated into the furnace 412, they may readily be replaced upon wearing due to the passage of electrical current or breakage.

Figure 6:
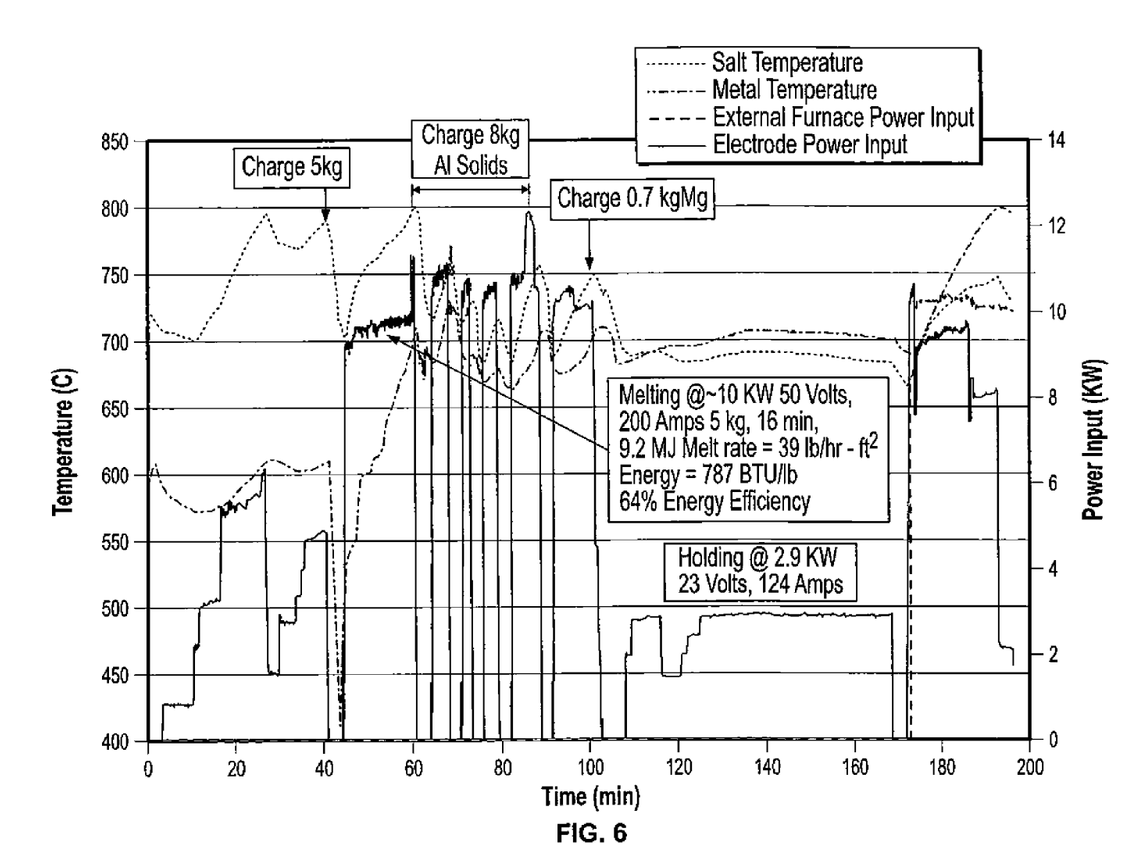
FIG. 6 is a graph showing data derived from a comparative energy efficiency experiment.

FIG. 6 graphically shows heating and melting data for experimental use of a bench scale furnace like the furnace shown in FIG. 5. The results indicate that the specific melt rates achieved are comparable to a 120 ton capacity commercial gas-fired reverberatory melting furnace. 30 kg of CsCl salt was introduced into the bench scale furnace. The salt was melted to a temperature of 800° C., and maintained at that temperature thermostatically by Joule heating. At about 44 minutes, a 5 kg charge of solid aluminum was introduced into the furnace. The electrical input required to maintain a temperature of 800° C. was monitored as shown in the graph in FIG. 6. At about 60 minutes, the 5 kg charge of aluminum previously introduced was observed to be melted. The total energy required to maintain the temperature of the salt and melt the aluminum was observed to be 9.2 MJ, which was supplied to the system by electrical input of 10 KW, at 50 volts, 200 amps for 16 minutes. This resulted in a melting rate of 39 lbs/hr-ft$^2$ at 787 BTU/lb.

At about 60 minutes, a further charge of 8 kg of solid aluminum in the form of aluminum ingot was added over a period of 30 minutes to determine the energy required to melt it. At 100 minutes, a charge of 0.7 kg of magnesium was added in order to test the reactivity of Mg with the salt. The metal and salt temperature was then held in a range of about 675 to 710 degrees C. for about 1 hour and 12 minutes.

Holding the temperature within that range consumed 2.9 KW of energy, i.e., 23 volts at 124 amps, showing the energy loss during holding.

Figure 7:
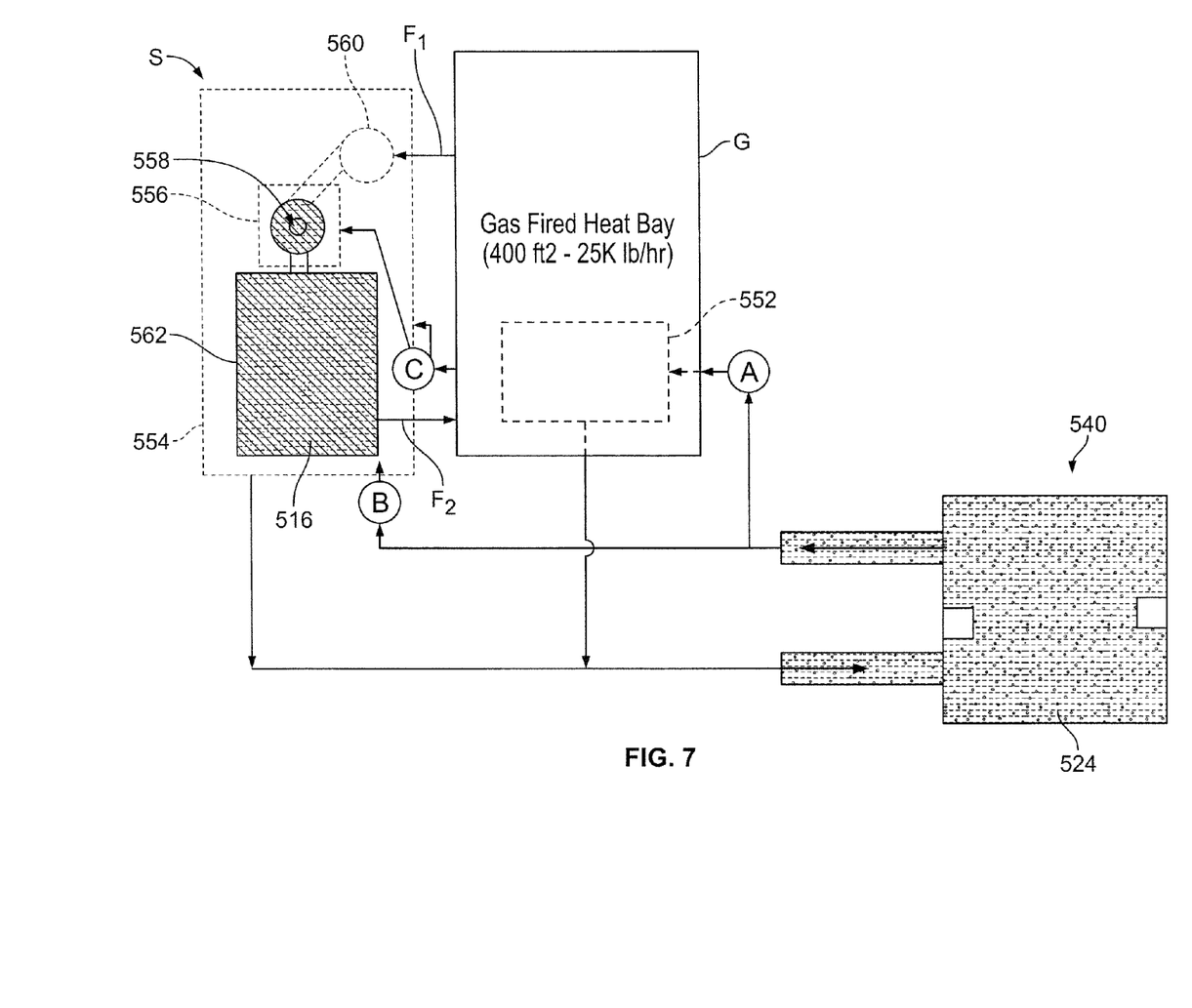
FIG. 7 is schematic plan view of a sidewell furnace with a heat bay that may be replaced with, or supplemented by, a heat bay in accordance with another embodiment of the present disclosure.

FIG. 7 illustrates how teachings of the present disclosure may be used to modify an exiting continuous sidewell system S. More particularly, a gas fired heat bay G may be replaced, or supplemented, by an electrically heated salt heat bay 540 like salt heat bay 240 shown in FIG. 3B. For example, molten salt 524 heated in the heat bay 540 may be pumped to and from the gas fired heat bay G and/or the sidewell S, where it occupies a position below the molten aluminum layer, as in FIGS. 3A-3B, and melts/maintains the melt temperature of the aluminum metal that is placed in the sidewell S or is contained in the gas fired heat bay G. The salt bath 524 may be positioned below the molten aluminum pool that is pumped around and through the charging well 558, the salt bath heating the molten aluminum, which can then be used to melt solid aluminum charge. More particularly, the molten salt 524 exiting heat bay 540 may be pumped to location A where it enters a reservoir 552 underlying all or part of the gas-fired heat bay G. The reservoir 552 may contact molten aluminum in the gas-fired heat bay (form a layer beneath it) or occupy a separate chamber. The salt 524 may also or alternatively be directed to location B where it enters reservoir 554 underlying all or part of the sidewell furnace S. Optionally, the salt may be pumped to a reservoir 556 underlying the charging well 558. The sidewell S would utilize a pump 560 which pumps molten aluminum (flow F1) into charging basin 558 where solid aluminum, e.g., scrap to be recycled, would be deposited in the vortex of molten aluminum for melting. After discharge into skim bay 562, where oxides and detrius are skimmed from the molten metal, the melted aluminum may then be passed into the gas-fired heat bay G (flow F2), where it is retained until discharge into ingot molds, etc. Molten salt passing through a receptacle, e.g., 552 associated with the gas-fired heat bay G may optionally be pumped to location C where it then enters reservoir 554 and/or is directed to reservoir 556. Since the hot salt 524 need not be vented to atmosphere to release combustion products, the heat generated therein by electricity can be more effectively contained and not wasted. The salt heat bay 540 may be used in conjunction with or as a substitute for gas-fired heating based upon the availability and relative costs of heating by electricity or gas.

The apparatus and methods described above may be operated at efficiency levels of 90% and above based upon a 10% loss of heat through the walls of the furnace, which would be insulated. The apparatus and methods disclosed above allow the holding chamber, e.g., 12, 112, 212, 312, 412 and/or salt bay 240, 540 to be fully or partially sealed to exclude environmental air, thereby reducing oxidation and hydrogen pickup. Reduced oxidation translates into greater melt yields by reducing melt losses. In addition, the molten salt 24, 124, etc. can support greater energy density than currently available electric immersion heaters and therefore yields higher melt rates. Further, since heat rises due to buoyancy effects, the position of the dense salt layer 24 below the aluminum 14, 16 facilitates heat transfer and reduces heat loss from the furnace 10. The phase salt/aluminum separation also inhibits oxides associated with the aluminum 14, 16 from becoming entrained in the salt 24.

It will be understood that the embodiments described herein are merely exemplary and that a person skilled in the art may make many variations and modifications without departing from the spirit and scope of the disclosure. All such variations and modifications, in addition to those described above, are intended to be included within the scope of the disclosure.

We claim:

1. An apparatus capable of being connected to a source of electrical power for melting aluminum, comprising:
   a receptacle having a first portion capable of containing a salt, and a second portion capable of containing aluminum, the first portion being disposed below and in fluid communication with the second portion;
   a salt of at least one of the metals selected from the group Rubidium, Cesium, and Strontium disposed in the first portion, the salt having a density greater than molten aluminum;
   a pair of spaced electrodes disposed in the first portion;
   the source of electrical power capable of establishing an electrical potential between the spaced electrodes, the salt supporting an electric current between the electrodes that heats the salt through Joule heating to a temperature above the melting point of aluminum; a cover disposed over the second portion.

2. The apparatus of claim 1, further comprising a non-reactive gas present in the receptacle between the aluminum in the second portion and the cover.

3. The apparatus of claim 2, wherein the gas is Argon.

4. An apparatus capable of being connected to a source of electrical power for melting aluminum, comprising:
   a receptacle having a first portion capable of containing a salt, and a second portion capable of containing aluminum, the first portion being disposed below and in fluid communication with the second portion;
   a salt of at least one of the metals selected from the group Rubidium, Cesium, and Strontium disposed in the first portion, the salt having a density greater than molten aluminum;
   a pair of spaced electrodes disposed in the first portion;
   the source of electrical power capable of establishing an electrical potential between the spaced electrodes, the salt supporting an electric current between the electrodes that heats the salt through Joule heating to a temperature above the melting point of aluminum wherein the receptacle is divided into a first receptacle for the first portion and a second receptacle for the second portion, the first and second receptacles in fluid communication.

5. The apparatus of claim 4, further comprising a pump to move the salt between the first receptacle and the second receptacle.

6. The apparatus of claim 5, wherein the second receptacle underlies a sidewell furnace.

7. The apparatus of claim 6, wherein the second receptacle underlies a charging well of the sidewell furnace.

8. The apparatus of claim 5, wherein the second receptacle underlies a gas-fired heat bay.

9. The apparatus of claim 4, further comprising a reservoir in communication with the second portion to receive and store molten aluminum.

10. The apparatus of claim 9, further comprising a plurality of reservoirs in communication with the second portion to receive and store molten aluminum.

11. The apparatus of claim 4, wherein the first portion and the second portion are contiguous with one another.

12. The apparatus of claim 4, wherein the salt further comprises a Barium salt mixed therewith.

13. The apparatus of claim 4, further comprising an apparatus for melting the salt to liquid form.

14. An apparatus capable of being connected to a source of electrical power for melting aluminum, comprising:
   a receptacle having a first portion capable of containing a salt, and a second portion capable of containing aluminum, the first portion being disposed below and in fluid communication with the second portion;

a salt of at least one of the metals selected from the group Rubidium, Cesium, and Strontium disposed in the first portion, the salt having a density greater than molten aluminum;

a pair of spaced electrodes disposed in the first portion;

the source of electrical power capable of establishing an electrical potential between the spaced electrodes, the salt supporting an electric current between the electrodes that heats the salt through Joule heating to a temperature above the melting point of aluminum wherein the second portion has a greater volumetric capacity than the first portion.

15. The apparatus of claim 14, wherein the electrical power is AC.

16. An apparatus capable of being connected to a source of electrical power for melting aluminum, comprising:

a receptacle having a first portion capable of containing a salt, and a second portion capable of containing aluminum, the first portion being disposed below and in fluid communication with the second portion;

a salt of at least one of the metals selected from the group Rubidium, Cesium, and Strontium disposed in the first portion, the salt having a density greater than molten aluminum;

a pair of spaced electrodes disposed in the first portion;

the source of electrical power capable of establishing an electrical potential between the spaced electrodes, the salt supporting an electric current between the electrodes that heats the salt through Joule heating to a temperature above the melting point of aluminum, wherein the electrodes extend through the aluminum in the second portion down to the salt in the first portion, each of the electrodes having an insulator coating on a portion thereof that extends through the aluminum, the insulator coating being absent from at least a part of each of the electrodes that extends into the salt.

\* \* \* \* \*